(12) United States Patent
Libal et al.

(10) Patent No.: US 10,786,696 B2
(45) Date of Patent: Sep. 29, 2020

(54) USE OF AN INDICATOR AS A MARKER IN FOAM CONCENTRATES

(71) Applicant: TYCO FIRE PRODUCTS LP, Lansdale, PA (US)

(72) Inventors: John P. Libal, Peshtigo, WI (US); Mark A. Siem, Menominee, MI (US)

(73) Assignee: Tyco Fire Products LP, Lansdale, PA (US)

( * ) Notice: Subject to any disclaimer, the term of this patent is extended or adjusted under 35 U.S.C. 154(b) by 341 days.

(21) Appl. No.: 15/550,551

(22) PCT Filed: Feb. 11, 2016

(86) PCT No.: PCT/US2016/017556
§ 371 (c)(1),
(2) Date: Aug. 11, 2017

(87) PCT Pub. No.: WO2016/130810
PCT Pub. Date: Aug. 18, 2016

(65) Prior Publication Data
US 2018/0036566 A1 Feb. 8, 2018

Related U.S. Application Data

(60) Provisional application No. 62/115,693, filed on Feb. 13, 2015.

(51) Int. Cl.
A62D 1/02 (2006.01)
C09K 11/06 (2006.01)
C09K 11/61 (2006.01)
G01N 21/33 (2006.01)
G01N 21/77 (2006.01)

(52) U.S. Cl.
CPC .......... *A62D 1/0085* (2013.01); *A62D 1/0071* (2013.01); *C09K 11/06* (2013.01); *C09K 11/61* (2013.01); *G01N 21/33* (2013.01); *G01N 21/77* (2013.01); *C09K 2211/14* (2013.01)

(58) Field of Classification Search
CPC .... A62D 1/0085; A62D 1/0071; G01N 21/33; G01N 21/77
See application file for complete search history.

(56) References Cited

U.S. PATENT DOCUMENTS

| | | | |
|---|---|---|---|
| 2,967,099 A * | 1/1961 | Pool | C06B 23/002 149/89 |
| 3,047,619 A | 7/1962 | Brace | |
| 3,257,407 A | 6/1966 | Brace | |
| 3,258,423 A | 6/1966 | Tuve et al. | |
| 3,562,156 A | 2/1971 | Francen | |
| 3,621,059 A | 11/1971 | Bartlett | |
| 3,634,233 A * | 1/1972 | Hiltz | A62D 1/0071 252/3 |
| 3,655,555 A | 4/1972 | Rossmy et al. | |
| 3,661,776 A | 5/1972 | Fletcher et al. | |
| 3,677,347 A | 7/1972 | Rosen et al. | |
| 3,759,981 A | 9/1973 | Hager et al. | |
| 3,772,099 A * | 11/1973 | Ryan | C06B 23/008 149/18 |
| 3,772,195 A | 11/1973 | Francen | |
| 3,772,199 A | 11/1973 | Tamai et al. | |
| 3,789,265 A | 1/1974 | Holz et al. | |
| 3,828,085 A | 8/1974 | Price et al. | |
| 3,839,425 A | 10/1974 | Bartlett et al. | |
| 3,849,315 A | 11/1974 | Chiesa, Jr. | |
| 3,941,708 A | 3/1976 | Gentit et al. | |
| 3,952,075 A | 4/1976 | Nakamura et al. | |
| 3,957,657 A | 5/1976 | Chiesa, Jr. | |
| 3,957,658 A | 5/1976 | Chiesa et al. | |
| 3,963,776 A | 6/1976 | Middleton | |
| 4,038,198 A | 7/1977 | Wagner et al. | |
| 4,042,522 A | 8/1977 | Falk | |
| 4,049,556 A | 9/1977 | Tujimoto et al. | |
| 4,060,132 A | 11/1977 | Chiesa, Jr. | |
| 4,060,489 A | 11/1977 | Chiesa, Jr. | |
| 4,069,158 A | 1/1978 | Bertocchio et al. | |
| 4,090,976 A | 5/1978 | Dehollander et al. | |
| 4,099,574 A | 7/1978 | Cooper et al. | |
| 4,149,599 A | 4/1979 | Chiesa, Jr. | |
| 4,168,239 A | 9/1979 | Mertz et al. | |
| 4,203,850 A | 5/1980 | Wirtz et al. | |
| 4,209,407 A | 6/1980 | Schuierer et al. | |
| 4,387,032 A | 6/1983 | Chiesa, Jr. | |
| 4,536,298 A | 8/1985 | Kamei et al. | |
| 4,795,590 A | 1/1989 | Kent et al. | |

(Continued)

FOREIGN PATENT DOCUMENTS

| | | | |
|---|---|---|---|
| WO | 03006586 | | 1/2003 |
| WO | WO 2007/105162 | * | 9/2007 |
| WO | 2014200850 | | 12/2014 |

OTHER PUBLICATIONS

Written Opinion of the ISA for PCT/2016/017556.
BASF Corporation the Chemical Company, Tinopal NFW Liquid: Formulation Additives Technical Data Sheet, Aug. 2010, pp. 1-3.

*Primary Examiner* — C Melissa Koslow
(74) *Attorney, Agent, or Firm* — Foley & Lardner LLP

(57) ABSTRACT

Provided are fire-fighting foam concentrate compositions incorporating multiple dye indicator agents, fire-fighting foams formed from said compositions, and to methods for evaluating fire-fighting foam concentrates. The compositions are useful as a complex anti-counterfeiting system and also allow for the differentiation of different types of authentic concentrates.

18 Claims, 1 Drawing Sheet

(56) References Cited

U.S. PATENT DOCUMENTS

| | | | |
|---|---|---|---|
| 4,923,903 A | 5/1990 | Alm et al. | |
| 4,965,063 A * | 10/1990 | Casey | A01N 25/06 |
| | | | 424/10.3 |
| 5,085,786 A | 2/1992 | Alm et al. | |
| 5,207,932 A | 5/1993 | Norman et al. | |
| 5,218,021 A | 6/1993 | Clark et al. | |
| 5,391,721 A | 2/1995 | Hanen et al. | |
| 5,616,273 A | 4/1997 | Clark et al. | |
| 5,750,043 A | 5/1998 | Clark | |
| 5,820,776 A | 10/1998 | Hansen et al. | |
| 5,945,026 A | 8/1999 | Thames | |
| 5,990,486 A | 11/1999 | Chen et al. | |
| 6,139,775 A | 10/2000 | Thames | |
| 6,231,778 B1 | 5/2001 | Hansen | |
| 6,436,306 B1 | 8/2002 | Jennings | |
| 6,599,872 B1 | 7/2003 | Hubert et al. | |
| 6,645,391 B2 * | 11/2003 | Greiner | A62D 1/00 |
| | | | 169/44 |
| 7,163,642 B2 * | 1/2007 | Hagquist | A62C 2/065 |
| | | | 169/44 |
| 7,381,696 B2 | 6/2008 | Hubert et al. | |
| 8,298,436 B2 | 10/2012 | Michael | |
| 8,524,104 B1 | 9/2013 | Michael | |
| 2003/0001129 A1 | 1/2003 | Hubert et al. | |
| 2013/0277597 A1 | 10/2013 | Bowen et al. | |
| 2016/0258868 A1 | 9/2016 | Calhoun et al. | |

* cited by examiner

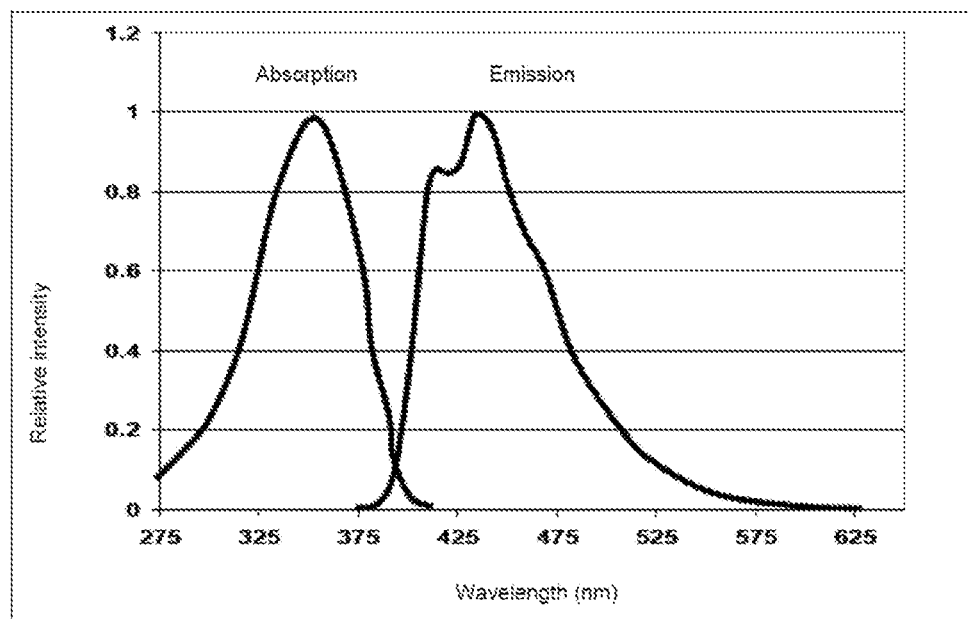

USE OF AN INDICATOR AS A MARKER IN FOAM CONCENTRATES

CROSS-REFERENCE TO RELATED APPLICATION

This application is a 35 U.S.C. § 371 application of International Application No. PCT/US2016/017556 filed Feb. 11, 2016, which claims the benefit of U.S. Provisional Application Ser. No. 62/115,693 filed on Feb. 13, 2015, the disclosures of which are incorporated by reference herein in their entireties.

BACKGROUND

Technical Field

The disclosure relates generally to fire-fighting foam concentrate compositions, fire-fighting foams formed from said compositions, and to methods for evaluating fire-fighting foam concentrates.

Description of the Related Art

It is well known that the application of foam is useful to suppress fires. The foam is generated at the site of a fire, typically by mechanically aerating a diluted solution of fire-fighting foam concentrate with suitably designed equipment, thereby entrapping air bubbles in the composition and causing it to expand. A fire-fighting foam concentrate is a foamable composition that contains one or more foam precursors, such as one or more surfactants and/or polymers, combined with one or more solvents and optionally other additives that provide the desired mechanical and chemical properties for the foam.

Fire-fighting foams require certain properties to be useful in intended fire prevention and/or fire suppression applications, and these properties are determined predominantly by the chemical composition of the concentrate. For example, appropriate surfactants can provide a composition with low surface tension, high foamability and good film-forming properties, which is particularly important when the foams are to be projected onto the surface of a burning liquid. Manufacturers also have stringent quality control standards, with specific requirements for foam or foam concentrate properties such as pH, density, viscosity, expansion ratio, burn-back test performance, resistance to polar solvents, temperature conditioning, freeze point, etc. It is also of significant importance that fire-fighting foams have low toxicity and are environmentally safe, including no banned substances such as polybrominated diphenyl ether (PBDE) flame retardants or perfluorooctane sulfonate (PFOS) surfactants, have low volatile organic compound (VOC) emissions, and are not bio-accumulative.

Due to these concerns, fire-fighting concentrates and foams are highly regulated by global regulatory agencies, and foam concentrate manufacturers take great care to comply with the required specifications and earn certifications from organizations such as the Underwriter's Laboratory (UL), the International Organization for Standardization (ISO) or the International Civil Aviation Organization (ICAO). For many applications, the use of a foam or form concentrate is forbidden without the proper certification. Unfortunately, this has led to an industry-wide counterfeiting problem wherein counterfeiters either pass off their low quality products as being the high quality brand of a different manufacturer or by marking their products with fake certification markings. Accordingly, there is a need in the art for a simple and effective means of validating the authenticity of a foam or foam concentrate product that is advertised as meeting the required quality and/or regulatory standards.

Several different types of anti-counterfeiting solutions are known, including overt solutions (i.e., those which are visible and verifiable without any tools, such as holograms), semi-covert solutions (i.e., those which are hidden but verifiable with non-specialized tools, such as invisible printing), covert solutions (i.e., those which are verifiable with specialized tools in the field, such as digital watermarks), forensic solutions (i.e., those which require laboratory analysis for authentication, such as chemical or biological taggants), and track and trace technology (such as bar coding, serialization or radio frequency identity (RFID) tagging). Each of these classes of anti-counterfeiting technology has its advantages and disadvantages, and the best choice for a particular application depends on the unique needs of the particular industry or product.

The use of a dye as a fire-fighting foam additive is known, for example, from U.S. Pat. Nos. 5,945,026 and 6,139,775 which teach fire-fighting concentrate compositions incorporating a non-fluorescent dye for visualizing and detecting the coverage of a fire-fighting agent when viewed in ambient light. U.S. Pat. No. 6,645,391 teaches a fire-fighting concentrate composition incorporating a fluorescent type compound effective to permit visualization or tracing of their composition in low light or no light conditions. U.S. Pat. No. 5,990,486 teaches an apparatus and method for measuring components and enhancing visibility of the liquid stream by detecting and measuring the concentration of an indicator agent, such as a fluorescent dye, in the stream. U.S. Pat. No. 4,923,903 teaches colored aqueous foams that are the reaction product of a poly(oxyalkylene) polyisocyanate prepolymer and an isocyanate-reactive dye, wherein the foams are employed to protect and coloring substrates, making them more visible, decorative or less visible. U.S. Pat. No. 4,168,239 teaches adding a colorant to a fire-fighting concentrate allowing the concentrate to be visible for aerial and ground tanker application even after it is diluted with water, although these concentrates are not described as foam-forming compositions.

While the aforementioned disclosures have usefully employed dyes in fire-fighting compositions for their own stated purposes, each is inadequate for use as an effective anti-counterfeiting measure because their systems are easy to copy, particularly once the use of a dye is known. Accordingly, there remains a need in the art for fire-fighting foams or foam concentrates incorporating an effective anti-counterfeiting system. The disclosure provides a solution to this need in the art and other needs.

SUMMARY OF THE DISCLOSURE

The disclosure relates to fire-fighting foam concentrate compositions incorporating a plurality of dyes that are used as authenticating markers and the foams formed therefrom. In the art of fire-fighting foams, employing a covert or semi-covert solution, such as an invisible, detectable dye, is highly desirable for its simple implementation, low cost, and for its ease of detection in the field. The use of a detectable dye in a fire-fighting foam or foam concentrate composition is also highly desirable because they are generally inert with respect to the performance and fire-fighting properties of the composition and do not require regulatory approval.

Provided is a foamable composition comprising a foam-forming agent and at least two distinguishable dye components, as well as foams formed from the foamable composition.

Also provided is a foamable composition comprising a foam-forming agent and at least one halochromic substance, as well as foams formed from the foamable composition.

Also provided is a method for authenticating a foamable composition comprising:

a) providing a foamable composition comprising a foam-forming agent and at least two distinguishable dye components, wherein at least one of said dye components is responsive to electromagnetic radiation having a wavelength of from about 200 nm to about 2000 nm, and wherein at least one of said dye components is optionally a halochromic substance;

b) irradiating the foamable composition with electromagnetic radiation having a wavelength of from about 200 nm to about 2000 nm;

c) determining the presence of a response from at least one dye component responsive to said irradiation;

d) optionally repeating steps b) and c) at least once to determine the presence of additional dye components responsive to said irradiation at a different wavelength;

e) optionally contacting the foamable composition with a pH modifying substance sufficient to detect the presence of a halochromic substance; and f) optionally, comparing the responses determined in step c) and/or e), respectively, to standard responses.

Importantly, the use of dyes in this manner allows for the simple, expedient and inexpensive determination of whether a fire-fighting concentrate is authentic or counterfeit.

BRIEF DESCRIPTION OF THE DRAWINGS

FIG. 1 is a graphical representation of the absorption and emission spectra of TINOPAL® NFW fluorescent dye in a blend of dimethylformamide and water.

DETAILED DESCRIPTION

The foamable compositions provided herein comprise a foam-forming agent and at least two distinguishable dye components. The definition of a "dye" as used herein includes pigments. As used herein, "distinguishable" dye components means different dyes that are capable of being distinguished from each other and independently detected and/or identified as different in the foam concentrate when each dye is detected under the appropriate conditions, even when the dyes are homogeneously blended in the foam concentrate. In this regard, it is not required that the distinguishable dye components be distinguishable from each other or from the foam under all conditions, and the term "distinguishable dye components" expressly includes dyes that are not distinguishable from each other under one stimulating condition, but are distinguishable from each other under another stimulating condition. For example, two fluorescent dyes may be indistinguishable from each other and indistinguishable from a foam concentrate under visible light, but distinguishable from each other and the foam concentrate when irradiated with ultraviolet light. Similarly, a visible dye may be indistinguishable from a fluorescent dye when the foam concentrate is irradiated with visible light under which the fluorescent dye is not visible, but wherein said dyes are capable of being distinguished from each other when irradiated with ultraviolet light. The distinguishable dye components may be separately detectable. It is not required for them to be concurrently detectable. For example, a foam concentrate sample may be tested to determine the presence of a halochromic substance by increasing the foam pH of the sample, while another sample of the same foam concentrate may be separately tested to determine the presence of a fluorescent dye by irradiating the sample with ultraviolet light of one or more wavelengths. Such dyes are still capable of being distinguished from each other, despite not being visible and distinguishable from each other under a single stimulus. As another example, a foam concentrate including a visible dye (e.g. red dye) and a halochromic dye (e.g. Thymolphthalein) may appear to be a first color (e.g. red) when irradiated with visible light and at a neutral pH, but then change to a second, different color (e.g. blue or purple) at a higher, alkaline pH.

The foam-forming agent may be any material or composition that is useful for suppressing fires, and most typically comprises a mixture of components that together form a foam concentrate. Typical components of a foam concentrate non-exclusively include one or more fluorinated materials, such as fluoropolymers and/or fluorosurfactants, or one or more non-fluorinated materials, such as non-fluorinated polymers and/or non-fluorinated surfactants (e.g. hydrocarbon surfactants). Also useful are foam concentrates including both one or more fluorinated materials as well as one or more non-fluorinated materials.

The term "fluorosurfactants" as used herein refers to surfactants which are fluorinated and comprise a hydrophobic group and hydrophilic group. Fluorosurfactants may be ionic (anionic, cationic, amphoteric) or nonionic. Fluorosurfactants are known to one skilled in the art, including but not limited to those disclosed in U.S. Pat. Nos. 3,258,423; 4,536,298; 4,795,590; and 5,085,786. In other aspects, the composition may comprise a fluorocarbon polymer. Fluorocarbon polymers are known to one skilled in the art and include, but are not limited to, those disclosed in U.S. Pat. Nos. 5,616,273; 5,750,043, and 5,218,021. Particularly preferred are fluorosurfactants containing pendant perfluoroalkyl side chains having no more than six carbon atoms. Such are commonly known in the art as C6 fluorosurfactants.

Suitable non-fluorinated materials non-exclusively include hydrocarbon surfactants. The term "hydrocarbon surfactants" as used herein refers to surfactants which are non-fluorinated surfactants and comprise a hydrophobic group and hydrophilic group. Hydrocarbon surfactants may be ionic (anionic, cationic, amphoteric) or nonionic. Hydrocarbon surfactants are known to one skilled in the art, including but not limited to those disclosed in U.S. Pat. Nos. 4,795,590; 3,772,195; 5,207,932; 6,436,306. Any suitable hydrocarbon surfactant known to one skilled in the art may be used in the foamable compositions. Amphoteric hydrocarbon surfactants include those comprising amino and carboxy groups, and those comprising amino and sulfo groups. Nonionic hydrocarbon surfactants include polyoxyethylene derivatives of alkyl phenols, linear or branched alcohols, fatty acids, alkyl polyglycosides, and block copolymers containing polyoxyethylene and polyoxypropylene units. Other examples of hydrocarbon surfactants include for example, sodium laureth sulfate, also known as sodium lauryl ether sulfate (SLES); polyoxyethylene ether alcohol; dioctyl sodium sulfosuccinate; ammonium alkyl phenoxy polyoxyethylene sulfate; and alkyl ether sulfate surfactants.

The foamable composition is preferably provided in the form of a solution, dispersion or emulsion, wherein the foam-forming agent or agents are mixed with one or more solvents. Useful solvents non-exclusively include water, a water miscible solvent, or combination thereof. Water miscible solvents include, for example, alcohols (for example, ethanol, propanol, iso-propyl alcohol, t-butyl alcohol); glycols (for example, ethylene glycol, propylene glycol, 1,4-butanediol); and glycol derivatives (for example butyl carbitol also known as diethylene glycol monobutyl ether, and dipropylene glycol monobutyl ether). Preferred solvents include water, iso-propyl alcohol, t-butyl alcohol, glycol, butyl carbitol, and hexylene glycol.

The foamable compositions also preferably include one or more additives such as inorganic salts, preservatives, corrosion inhibiters, chelating agents, pH buffers, lubricants, viscosity modifiers, emulsifiers, dispersants, and the like. Inorganic salts are particularly useful additives as they help increase the ionic strength of the concentrate as well as increase the total dissolved solids content of the concentrate, and may also aid in film formation in soft water systems. Useful inorganic salts non-exclusively include magnesium sulfate heptahydrate and urea. Other appropriate salts would be readily determined by those skilled in the art.

Particularly useful foam-forming agents to which the dyes described herein may be added are described in U.S. Pat. Nos. 5,391,721; 5,820,776; 6,231,778; 6,599,872; 7,381,696; 8,298,436; and 8,524,104, as well as U.S. pre-grant publications 2003/0001129 and 2013/0277597, all of which are assigned to Tyco Fire Products LP of Lansdale, Pa., and each of which is incorporated herein by reference to the extent consistent herewith. Other useful foam-forming agents non-exclusively include aqueous film-forming foam (AFFF) concentrates such as those described in, for example, U.S. Pat. Nos. 3,047,619; 3,257,407; 3,258,423; 3,562,156; 3,621,059; 3,655,555; 3,661,776; 3,677,347; 3,759,981; 3,772,199; 3,789,265; 3,828,085; 3,839,425; 3,849,315; 3,941,708; 3,95,075; 3,957,657; 3,957,658; 3,963,776; 4,038,198; 4,042,522; 4,049,556; 4,060,132; 4,060,489; 4,069,158; 4,090,976; 4,099,574; 4,149,599; 4,203,850; and 4,209,407, each of which is incorporated herein by reference to the extent consistent herewith. Also useful are alcohol resistant AFFF (ARAFFF) concentrates, such as those described in, for example, U.S. Pat. Nos. 4,060,489; 4,149,599 and 4,387,032, which are incorporated herein by reference to the extent consistent herewith. Also useful are military specification aqueous film forming foam (AFFF-MS) concentrates, standard protein-based foam concentrates, fluoroprotein foam concentrates, film-forming fluoroprotein foam concentrates (FFFP), and alcohol-resistant film Forming fluoroprotein foam concentrates (AR-FFFP). Each of these foam types is generally available at multiple different expansion ratios allowing for their utility in various different applications.

In accordance with the disclosure, the foamable composition further includes at least two distinguishable dye components wherein at least one of the dyes is preferably a luminescent dye. As noted above, "distinguishable" dye components are dyes that are distinct and capable of being distinguished from each other in a foam concentrate composition. The dyes may also be capable of being distinguished from the foam concentrate when blended in the foam concentrate. Each dye is preferably miscible with a foam concentrate, and each of the dyes is preferably homogeneously blended in the foam concentrate. Even when the dyes are homogeneously blended in the concentrate, at least two of the dyes appear as separate, individual colors in the concentrate when stimulated by radiation that the individual dyes absorb. In a concentrate including more than two dyes, it is only necessary that at least two of the dyes appear as separate, individual colors in the concentrate when stimulated by radiation that the individual dyes absorb, but it is most preferred that all the dyes in a concentrate formulation appear as separate, individual colors in the concentrate when stimulated by radiation that the individual dyes absorb.

As used herein, a "luminescent" dye is a substance that emits light when stimulated by radiation other than heat. Typical luminescent dyes absorb light within a specific band of wavelengths of the electromagnetic spectrum and emit light at a different, typically longer wavelength. Luminescent dyes include both fluorescent dyes and phosphorescent dyes. A fluorescent dye luminesces when stimulated by ultraviolet radiation. They absorb ultraviolet radiation and emit visible radiation. A phosphorescent dye also luminesces when stimulated by ultraviolet radiation but does not immediately re-emit the radiation it absorbs. The most preferred luminescent dyes useful herein are fluorescent dyes.

Particularly preferred are fluorescent dyes that absorb short wavelength ultraviolet radiation, i.e., radiation having a wavelength of from about 200 nm to about 300 nm, and emit light in the visible spectrum having a wavelength of from about 400 nm to about 700 nm. Also particularly preferred are fluorescent dyes that absorb long wavelength ultraviolet radiation, i.e., radiation having a wavelength of from greater than about 300 nm to about 400 nm, and emit light in the visible spectrum having a wavelength of from about 400 nm to about 700 nm. A single luminescent dye may also have multiple luminescent responses as indicated by multiple intensity peaks in its luminescent spectrum, presenting differing luminescent responses to illuminations of the same or differing wavelengths.

Suitable fluorescent dyes non-exclusively include any commercially available fluorescent dye. Preferred fluorescent dyes include benzenesulfonic acid, 2,2'-([1,1'-biphenyl]-4,4'-diyldi-2,1-ethenediyl)bis-disodium salt (Chemical name: Fluorescent brightener 351), Hexasodium 2,2'-[vinylenebis[(3-sulphonato-4,1-phenylene)imino[6-(diethylamino)-1,3,5-triazine-4,2-diyl]imino]]bis(benzene-1,4-disulphonate) (Chemical name: Fluorescent brightener 357), and fluorescein. Particularly preferred are fluorescent dyes characterized as optical brighteners, which are chemical compounds that absorb light in the ultraviolet and violet regions of the electromagnetic spectrum (about 300-400 nm), and re-emit light in the blue region (about 400-500 nm). Particularly preferred fluorescent dyes that are characterized as optical brighteners are TINOPAL® NFW fluorescent dyes commercially available from BASF of Ludwigshafen, Germany. These particular optical brighteners are short UV biphenyl-stilbenes that absorb light at a wavelength of from about 300 nm to about 400 nm and emit light at a wavelength of from about 400 nm to about 500 nm. Illustrated in FIG. 1 is a graphical representation of the absorption and emission spectra of TINOPAL® NFW dye in a 1:1 blend of dimethylformamide and water (cell thickness=1 cm).

In a preferred embodiment, the foamable composition includes a first luminescent dye that emits light at a first wavelength and a second luminescent dye that emits light at a second, different wavelength. This is allows for multi-frequency fluorescence such that different elements fluoresce under specific frequencies of light. In a preferred embodiment, the foamable compositions include at least two distinguishable luminescent dye components wherein a first luminescent dye luminesces when stimulated by ultraviolet radiation having a wavelength of from about 200 nm to about 300 nm, and a second luminescent dye luminesces when stimulated by ultraviolet radiation having a wavelength of from greater than about 300 nm to about 400 nm.

Most preferably, each of the luminescent dyes is a fluorescent dye rather than a phosphorescent dye. In another embodiment, the foamable composition may comprise at least one water-soluble fluorescent dye and at least one water-insoluble fluorescent dye.

In an alternative embodiment, the foamable compositions include at least one luminescent dye and at least one non-luminescent dye. As used herein a non-luminescent dye is a substance that transmits and/or reflects light rather than emitting light. Non-luminescent dyes include visible dyes and halochromic dyes.

A visible dye is a chemical that absorbs and transmits and/or reflects light in the visible light spectrum, i.e., light having a wavelength of from about 400 nm to about 700 nm. No specialized equipment, such as an ultraviolet light source, is necessary for a human to see its color. Useful visible dyes are conventionally known and widely commercially available, particularly water-soluble visible dyes that are stable at a pH range of 7.0 to 8.5. Preferred water-soluble visible dyes non-exclusively include Benzoate Methyl Violet Lake commercially available from Paul Ulich & Co. (Hastings on Hudson, N.Y.), Green Shade #19162 commercially available from Tricon Colors, Inc. (Elmwood Park, N.J.), Diarylide Yellow commercially available from Sun Chemicals (Cincinnati, Ohio), and Phthalo Blue Lake G commercially available from Chemetron Corp. (Holland, Mich.). Also preferred are Nylosan Violet F-BL180, Nylosan Blue N-BLN SGR, Drimarene Green X3GL, Drimarene Orange CL-3R, Acid Yellow 23 CAS: 1934-21-0, Acid Green 25 CAS: 4403-90-1, and Acid Red 73 CAS: 5413-75-2, each of which is commercially available.

A halochromic dye is a substance whose visible color and or fluorescence is dependent on pH. Halochromic substances change color due to a chemical reaction that occurs with changes in acidity, typically where the color becomes darker or more pronounced as the substance becomes more alkaline. The chemical reaction changes the amount of light the halochromic substance absorbs, which results in a visible change of color. Such chemicals are most useful in foam concentrate compositions that are light in visible color wherein a color change in response to a pH change would be most noticeable. Halochromic dyes are conventionally known in the art and are commercially available. Useful pH modifying substances sufficient to effect a color change response are also conventionally known, and typically are simple bases such as sodium hydroxide or potassium hydroxide. The color changes are often reversible. Particularly preferred halochromic dyes non-exclusively include thymolphthalein, methyl orange, cresol red, phenyl red, o-cresolphthalein, methyl red, phenolphthalein, thymol blue and bromothymol blue. Of these, thymolphthalein is a particularly preferred dye, particularly its phthalid form which has the following molecular structure:

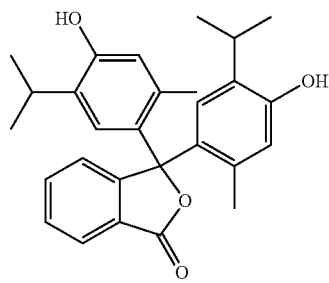 [SMILES: Cc1cc(O)c(C(C)C)cc1C1(c2cc(C(C)C)c(O)cc2C)OC(=O)c2ccccc21]

Thymolphthalein dyes transition from colorless to blue when the pH is raised above about 9.3-10.5 when contacted with an alkaline substance, such as sodium hydroxide.

In a preferred embodiment, at least one of said dye components is non-halochromic wherein it absorbs and is responsive to electromagnetic radiation having a wavelength of from about 200 nm to about 2000 nm at a neutral pH. However, compositions including only a halochromic dye or a plurality of halochromic dyes are also useful herein. In yet another preferred embodiment, the foamable compositions include at least one fluorescent dye, at least one visible dye and at least one halochromic substance. Increasing the number of dye components increases the complexity of the anti-counterfeiting system. For example, a two dye system presents four possible results during analysis: no dyes are present, both dyes are present, only the first dye is present, or only the second dye is present. In a three dye system, eight different results are possible: i.e., no dyes, all three dyes, first dye only, second dye only, third dye only, first and second dyes only, first and second dyes only, or second and third dyes only. Additional dyes add even greater complexity.

In the foam/foamable compositions provided herein, the combined dyes may be present in an amount of from about 0.0002% up to about 2 wt. % of the foamable composition, and typically from 0.0002% up to about 1 wt. %, but only a small amount of dye is needed to produce a useful response. In compositions including a visible dye, the visible dye is preferably present in an amount of from about 0.0001 wt % to about 0.1 wt % of the foamable composition, more preferably from about 0.001 wt % to about 0.1 wt % of the foamable composition, still more preferably from about 0.005 wt % to about 0.05 wt %, and most preferably a visible dye comprises up to about 0.01 wt % of the foamable composition. In compositions including a fluorescent dye, the fluorescent dye is preferably present in an amount of from about 0.0001 wt % to about 0.1 wt % of the foamable composition, more preferably from about 0.001 wt % to about 0.01 wt % of the foamable composition, still more preferably from about 0.003 wt % to about 0.007 wt %, and most preferably a fluorescent dye comprises up to about 0.005 wt % of the foamable composition. In compositions including a halochromic dye, the halochromic dye is preferably present in an amount of from about 0.0001 wt % to about 0.1 wt % of the foamable composition, more preferably from about 0.001 wt % to about 0.01 wt % of the foamable composition, still more preferably from about 0.003 wt % to about 0.007 wt %, and most preferably a halochromic dye comprises up to about 0.005 wt % of the foamable composition. These weight ranges are not intended to be limiting and are amounts in foamable compositions that may or may not have been diluted with a solvent such as water.

As noted above, the foam concentrate may be evaluated by checking for the presence of one or more dyes by irradiating the foamable composition with electromagnetic radiation, preferably radiation having a wavelength of from about 200 nm to about 2000 nm, to determine the presence of a response from at least one dye component responsive to said irradiation; and optionally repeating these steps to at least once to determine the presence of additional dye components responsive to irradiation at a different wavelength within said wavelength range. Optionally, the foamable composition may be contacted with a pH modifying substance sufficient to detect the presence of a halochromic substance. The authenticity of the composition may then be determined by comparing the detected dye profile with expected and/or standard responses. Beneficially, these dyed systems provide the ability to determine if the foam concentrate is authentic or counterfeit, such as to determine if a concentrate properly contains only environmentally acceptable C6 fluorochemistries. Different dye combinations can also be used to differentiate between different types of foam concentrates.

The following examples serve to illustrate preferred embodiments of the disclosure:

EXAMPLES

The practical use of a fluorescent dye, such as an optical brightener, and/or halochromic chemical as a marking agent in fire-fighting foams was determined by evaluating the appearance of compositions including various dyes and dye combinations under normal lighting or normal pH conditions relative to their appearance under ultraviolet light or under abnormal pH conditions. Foam concentrates including the following dyes were evaluated:

Visible Dyes
1) Nylosan Violet F-BL180
2) Nylosan Blue N-BLN SGR
3) Drimarene Green X3GL
4) Drimarene Orange CL-3R
5) Acid Yellow 23 CAS: 1934-21-0
6) Acid Green 25 CAS: 4403-90-1
7) Acid Red 73 CAS: 5413-75-2

Fluorescent Dyes
1) Benzenesulfonic acid, 2,2'-([1,1'-biphenyl]-4,4'-diyldi-2,1-ethenediyl)bis-disodium salt (Chemical name: Fluorescent brightener 351).
2) Hexasodium 2,2'-[vinylenebis[(3-sulphonato-4,1-phenylene)imino[6-(diethyl-amino)-1,3,5-triazine-4,2-diyl]imino]]bis(benzene-1,4-disulphonate) (Chemical name: Fluorescent brightener 357).
3) Fluorescein
4) TINOPAL® NFW dye commercially available from BASF.

Halochromic Dyes
1) Methyl Orange
2) Thymolphthalein
3) Cresol Red
4) Phenyl Red
5) o-Cresolphthalein
6) Methyl Red
7) Phenolphthalein
8) Thymol Blue
9) Bromothymol Blue Each of the above specified dyes were evaluated in sample foamable concentrate solutions that comprised a foam-forming agent and a solvent. One dye was added to each sample, and the concentrate solution composition was the same for all the samples. Initially, 1 wt. % of the respective dyes was added to each sample, and the samples were then diluted by a factor of 10. This was repeated until the dye was no longer visible. Samples containing combinations of the above dyes were also tested. One tested sample included a visible dye and a fluorescent dye selected from the lists above which were homogeneously blended together in a fluorine-containing foam concentrate composition. Another tested sample was a included 3-dye system including a visible dye, a fluorescent dye and a halochromic dye selected from the lists above which were homogeneously blended together in a fluorine-containing foam concentrate composition. Each dye was successfully individually detected and distinguished from each the other dyes in each sample.

The ability to detect the presence of the fluorescent dyes was then tested by irradiating the samples with ultraviolet light. The ability to detect the halochromic dyes in each composition was tested by adding an alkaline chemical to raise the pH until the halochromic compound in the sample transitioned from colorless to colored. From this testing, it was concluded that the addition of detectable dyes into a foam concentrate composition were excellent covert indicating agents. The fluorescent dyes were invisible under normal conditions but verifiable with non-specialized tools, and the halochromic dyes were only visible under abnormal pH conditions.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A foamable fire-fighting composition comprising a foam-forming agent and a dye component, wherein said dye component comprises at least one of:
   (i) a first luminescent dye that luminesces at a first wavelength when stimulated by ultraviolet radiation having a wavelength of from 200 nm to 300 nm; and a second luminescent dye that luminesces at a second, different wavelength when stimulated by ultraviolet radiation having a wavelength of from 300 nm to 400 nm; and
   (ii) at least two halochromic substances selected from thymolphthalein, methyl orange, cresol red, phenyl red, o-cresolphthalein, methyl red, phenolphthalein, thymol blue, and bromothymol blue.

2. The foamable fire-fighting composition of claim 1, wherein the dye component further comprises at least one visible dye.

3. The foamable fire-fighting composition of claim 1, wherein the dye component comprises at least two halochromic substances selected from thymolphthalein, methyl orange, cresol red, phenyl red, o-cresolphthalein, methyl red, phenolphthalein, thymol blue, and bromothymol blue.

4. A foamable fire-fighting composition comprising a foam-forming agent and a dye component, which comprises a first luminescent dye that luminesces at a first wavelength when stimulated by ultraviolet radiation having a wavelength of from 200 nm to 300 nm; and a second luminescent dye that luminesces at a second, different wavelength when stimulated by ultraviolet radiation having a wavelength of from 300 nm to 400 nm.

5. The foamable fire-fighting composition of claim 4, wherein said dye component further comprises at least one halochromic substance.

6. The foamable fire-fighting composition of claim 4, wherein the foam-forming agent comprises at least one fluoropolymer and/or at least one fluorosurfactant.

7. A foamable fire-fighting composition comprising a foam-forming agent and distinguishable dye components, wherein the distinguishable dye components comprise at least one luminescent dye, at least one visible dye and at least one halochromic substance.

8. The foamable fire-fighting composition of claim 7, comprising a first luminescent dye, which luminesces when stimulated by ultraviolet radiation having a wavelength of about 200 nm to about 400 nm; and at least one halochromic substance comprising one or more of thymolphthalein, methyl orange, cresol red, phenyl red, o-cresolphthalein, methyl red, phenolphthalein, thymol blue and bromothymol blue.

9. The foamable fire-fighting composition of claim 7, wherein the at least one halochromic substance comprises thymolphthalein and/or phenolphthalein.

10. The foamable fire-fighting composition of claim 7, wherein the at least one luminescent dye comprises one or more of benzenesulfonic acid-2,2'-([1,1'-biphenyl]-4,4'-diyldi-2,1-ethenediyl)bis-disodium salt; hexasodium 2,2'-[vinylene-bis[(3-sulphonato-4,1-phenylene)imino[6-(diethylamino)-1,3,5-triazine-4,2-diyl]imino]]bis(benzene-1,4-disulphonate); fluorescein and a biphenyl stilbene fluorescent dye.

11. The foamable fire-fighting composition of claim 10, wherein the biphenyl stilbene fluorescent dye absorbs light at a wavelength of 300 nm to 400 nm and emits light at a wavelength of 400 nm to 500 nm.

12. The foamable fire-fighting composition of claim 7, wherein the foam-forming agent comprises at least one fluoropolymer and/or at least one fluorosurfactant.

13. A fire-fighting foam formed from the foamable fire-fighting composition of claim 1.

14. A fire-fighting foam formed from the foamable fire-fighting composition of claim 4.

15. A fire-fighting foam composition formed from the foamable fire-fighting composition of claim 5.

16. A fire-fighting foam formed from the foamable fire-fighting composition of claim 7.

17. A method for authenticating a foamable fire-fighting composition comprising:
   a) providing a foamable fire-fighting composition comprising a blend of a foam-forming agent and a dye component, which comprises at least one of
      (1) a first luminescent dye that emits light at a first wavelength and a second luminescent dye that emits light at a second, different wavelength; wherein the first luminescent dye luminesces when stimulated by ultraviolet radiation having a wavelength of from 200 nm to 300 nm, and the second luminescent dye luminesces when stimulated by ultraviolet radiation having a wavelength of from greater than 300 nm to 400 nm; and
      (2) at least one luminescent dye that luminesces when stimulated by ultraviolet radiation having a wavelength of from 200 nm to 400 nm and at least one halochromic substance, wherein said halochromic substance comprises thymolphthalein, methyl orange, cresol red, phenyl red, o-cresolphthalein, methyl red, phenolphthalein, thymol blue, bromothymol blue and mixtures of two or more thereof;
   b) irradiating the foamable fire-fighting composition with ultraviolet radiation having a wavelength of from 200 nm to 400 nm;
   c) in response to said irradiation, determining the presence of an emission from at least one luminescent dye; and
   d)(1) optionally repeating steps b) and c) at least once to determine the presence of a second luminescent dye; and/or
   d)(2) contacting the foamable fire-fighting composition with a pH modifying substance sufficient to detect the presence of one of the at least one halochromic substance.

18. The method of claim 17, wherein said dye component comprises at least one fluorescent dye that luminesces when stimulated by ultraviolet radiation and at least one halochromic substance, and wherein step d)(2) is conducted.

* * * * *